United States Patent
Hirsbrunner et al.

(10) Patent No.: US 6,916,366 B2
(45) Date of Patent: Jul. 12, 2005

(54) AQUEOUS COMPOSITION FOR RENDERING A SUBSTRATE HYDROPHOBIC

(75) Inventors: Pierre Hirsbrunner, Corseaux (CH); Ian Horman, Blonay (CH)

(73) Assignee: Jacques Vionnet, Vessy (CH)

(*) Notice: Subject to any disclaimer, the term of this patent is extended or adjusted under 35 U.S.C. 154(b) by 0 days.

(21) Appl. No.: 09/902,555

(22) Filed: Jul. 10, 2001

(65) Prior Publication Data

US 2003/0021904 A1 Jan. 30, 2003

(51) Int. Cl.$^7$ .............................................. C09K 17/46
(52) U.S. Cl. .............................. 106/287.14; 106/287.1; 106/603; 405/263
(58) Field of Search ..................... 106/603, 2, 287.14, 106/287.1; 405/263

(56) References Cited

U.S. PATENT DOCUMENTS

| | | | | |
|---|---|---|---|---|
| 2,905,562 A | * | 9/1959 | Brown | 106/12 |
| 5,356,716 A | * | 10/1994 | Patel | 428/423.1 |
| 5,560,773 A | * | 10/1996 | Gimvang | 106/634 |
| 6,368,659 B1 | * | 4/2002 | Weber et al. | 427/136 |
| 2003/0021904 A1 | * | 1/2003 | Hirsbrunner et al. | 427/397.8 |

FOREIGN PATENT DOCUMENTS

| | | | |
|---|---|---|---|
| EP | 0 089 109 A1 | | 1/1999 |
| JP | 51-126986 | * | 11/1976 |
| JP | 54-28312 | * | 3/1979 |

\* cited by examiner

*Primary Examiner*—C. Melissa Koslow
(74) *Attorney, Agent, or Firm*—Winston & Strawn LLP

(57) ABSTRACT

A substrate treatment composition of an aqueous solution for imparting hydrophobicity to a substrate or for rendering the substrate hydrophobic. This solution preferably includes sodium and/or potassium methylsiliconate and sodium and/or potassium silicate. Also, the use of this composition for the treatment of a substrate to impart hydrophobicity or to render the substrate hydrophobic.

19 Claims, No Drawings

AQUEOUS COMPOSITION FOR RENDERING A SUBSTRATE HYDROPHOBIC

BACKGROUND

The present invention concerns an aqueous composition for rendering a substrate hydrophobic, as well as the use of this composition and a process for rendering the aforementioned substrate hydrophobic.

It is well known that the application of hydrophobing agents (namely substances, in the present description, that render the substrate water repellant), on an arid soil permits a substantial economy of water, because the treated surface presents an efficient barrier against the evaporation of irrigation water. European patent application 889,109 discloses the use of sodium or potassium methylsiliconate to render a substrate hydrophobic. This process, however, presents two disadvantages. First, the quantity of water needed to apply the methylsiliconate on a given surface is too great (about 10 to 20 $m^3$/hectare) and second, the cost of methylsiliconates is high, limiting the use of the process in many cases due to economic reasons. Thus, there is a need for improvement in this area.

SUMMARY OF THE INVENTION

The present invention relates to a substrate treating solution for increasing the hydrophobic properties of a substrate or for rendering the substrate hydrophobic. This solution includes an aqueous mixture of a C1 to C4 alkyl siliconate compound and a silicate compound, with the compounds being present in combination in amount effective to increase the hydrophobicity of the substrate after the solution is applied thereto.

Advantageously, the siliconate compound is an alkali metal alkyl siliconate and the silicate compound is an alkali metal silicate, with the silicate and siliconate compounds being present in a molar ratio of about 0.5:1 to 10:1. Preferably, the siliconate compound is a alkali metal methyl siliconate and the silicate compound is an sodium or potassium hydrosoluble silicate, with the silicate and siliconate compounds being present in a molar ratio of about 1:1 to 5:1. The most preferred siliconate compound is a sodium or potassium methyl siliconate and the most preferred silicate compound is an sodium or potassium ortho or meta-silicate, with the most preferred molar ratio being about 2:1 to 3:1.

The siliconate compound is typically present in an amount of about 0.1 and 1% by weight and the silicate compound is typically present in an amount of about 0.01 and 5% by weight. Also, the solution can also include a coloring agent, an agrochemical principle or both.

The invention also relates to a method of rendering a substrate hydrophobic which comprises applying one of the solutions described herein upon or within the substrate. Suitable substrates to be treated include one or more of sand, gravel, tree bark, sawdust, compost, earth and solid porous materials. The solution may be applied directly upon the substrate by spraying or sprinkling of the solution thereon, or it can be mixed with substrate forming components to form a pretreated mixture with the pretreated mixture then being deposited to form a hydrophobic portion of the substrate. In the treated substrate, the siliconate compound is typically present in an amount of between about 2 and 60 Kg, while the silicate compound is typically present in an amount of between about 2 and 150 Kg.

DETAILED DESCRIPTION OF THE INVENTION

The present invention specifically relates to an aqueous composition for the treatment of a substrate so as to render it hydrophobic, preferably including a sodium and/or potassium methylsiliconate and a sodium and/or potassium silicate. The present composition permits the reduction of the quantity of water needed for application of the hydrophobicity inducing ingredients on the substrate and thus lowers the cost of such applications.

Surprisingly, it has been observed that silicate salts contribute very efficiently to increasing the capacity of methylsiliconate to induce hydrophobicity. Applied alone, they show no capacity to induce hydrophobicity, even in high amounts, but in association with the hydrophobing agent, namely the methylsiliconate, they double its efficiency. This means that with only 50% of the amount of methylsiliconate, one obtains the same capacity to induce hydrophobicity as with methylsiliconate alone, when the methylsiliconate is applied in admixture with a silicate.

The aqueous composition according to the invention contains a quantity of silicate relative to siliconate in a molar ratio ranging from about 0.5 to 10, with preference for a composition containing about 2 to 3 moles of silicate for one mole of siliconate. Expressing the aqueous composition in the invention in concentration terms, it preferably contains between 0.01 and 1% of sodium and/or potassium methylsiliconate and between 0.01 and 5% of sodium and/or potassium silicate. The percentages in the present description are expressed by weight. In terms of molarity, 1 mole of silicate is considered to be 1 mole equivalent of $SiO_2$.

The siliconate compound may be any C1 to C4 alkyl siliconate compound. Methyl is the most preferred alkyl group as it is commercially available. Also, water soluble siliconate compounds are advantageous, with any of the alkali metal methyl siliconates being preferred.

The silicate compound to be used can be any hydrosoluble silicate, with ortho- or meta-silicates being preferred.

It surprisingly has been observed that the use of mixtures of methylsiliconate and silicate compounds induce, for the same depth of hydrophobing treatment, a protection against evaporation that is increased over that of the hydrophobic effect induced by methylsiliconate alone. For the most preferred mixtures, the increase is more than double that of the methylsiliconate alone. This phenomenon is explained by the fact that silicate, exposed to the ambient atmosphere, transforms into silicic acid (silica gel) which contributes markedly by steric hindrance, on co-application with methylsiliconate, to the desired effect of reducing evaporation.

The substitution of a significant part of the costly methylsiliconate by silicate permits a reduction of the amount of water needed for application by a factor of 2 and the quantity of the hydrophobing agent needed by a factor of 4, for a treatment offering the same evaporation protection. The cost of the treatment is thus reduced by a factor of about 3 to 4. In addition, the treatment is facilitated by the unexpected reduction in the volume of water needed for application.

The employment of silicates in Civil Engineering is long known. Silicates are used to reinforce works such as tunnels, mines and shafts as well as to protect masonry surfaces, to fireproof inflammable materials and for water treatment in the paper industry. The petroleum industry uses them more and more because they cost much less than organosiliconates (cf. Encycl. of Chem. Technol. Ullmann Vol. A23 pp. 711–715 and Kirk-Othmer 22, pp. 12–25.)

The composition according to the invention may also contain, among other ingredients, a coloring agent and/or an agrochemical principle, in usual concentrations known to those of ordinary skill in the art. The term "agrochemical principle" is used in the present description to mean a component that has a beneficial effect on an agricultural crop. Preferred agrochemical principles are chosen from the group constituted by a herbicide, an insecticide, a pesticide, an anti-fungal agent, a repulsive agent or mixtures thereof. The present invention also concerns the use of the composition for the hydrophobing treatment of a substrate by mixing or immersing substrate forming components with the treatment solution before application of the mixture to firm a hydrophobic portion of the substrate, or to the direct application of the treatment solution by spraying or sprinkling it onto a previously placed substrate.

The substrate is typically a material or a mixture of material components that is sufficiently porous so that the solution can be combined with it. Typical substrates are chosen from the group constituted by sand, gravel, tree bark, sawdust, compost, earth, solid porous materials and mixtures thereof. As noted above, one applies the treatment solution either directly on the substrate, or indirectly by pretreating the substrate forming components and subsequently disposing the pretreated components on a surface to be treated.

In the process by direct application on agricultural soil, one preferably applies between 2 and 60 kg of sodium and/or potassium methylsiliconate and between 2 and 150 kg of sodium and/or potassium silicate per hectare of soil.

In the case of pretreatment, one soaks, sprays or sprinkles the substrate with a solution containing between 0.01 and 1% by weight of sodium and/or potassium methylsiliconate and between 0.01 and 5% by weight of sodium and/or potassium silicate. This type of pretreatment can also be envisaged on classical substrates such as sand, gravel or earth, as well as on solid materials such as pavings, flower pots or earthenware objects.

EXAMPLES

1. Synergic Effect of Silicate/siliconate on Hydrophobing capacity

Test Method

A reference sample of sand is treated with a number of reactive agents, either alone or in isotropic admixtures and, after reaction, the degree of hydrophobicity imparted is evaluated. Thus, 100 ml of sand are mixed homogeneously with 20 ml of water containing defined quantities of industrial potassium methylsiliconate at 28% supplied by RHODIA (GSP) and/or technical grade sodium silicate SI), waterglass supplied by Riedel-deHaën, at 28% equivalent in $SiO_2$. After mixing, each sample of treated sand is dried in an oven (60° C./12 h), and tested after reaction for the degree of hydrophobicity on the dried crust and in the crushed mass using the "water drop" technique.

TABLE 1

HYDROPHOBING TREATMENT
Degree of hydrophobicity induced by industrial
potassium methylsiliconate (GSP) and technical grade
sodium silicate (SI) as described above on sand

| TRIAL | GSP (ppm) | SI (ppm) | HYDROPHOBICITY DEGREE*) | |
|---|---|---|---|---|
| | | | a) crust | b) mass |
| A | 0 | 10,000 | − | − |
| B | 1,200 | 0 | + | +/− |
| 1.0 | 800 | 0 | +/− | − |
| 1.1 | 800 | 1,200 | + | + |
| 1.2 | 800 | 800 | + | + |

TABLE 1-continued

HYDROPHOBING TREATMENT
Degree of hydrophobicity induced by industrial
potassium methylsiliconate (GSP) and technical grade
sodium silicate (SI) as described above on sand

| TRIAL | GSP (ppm) | SI (ppm) | HYDROPHOBICITY DEGREE*) | |
|---|---|---|---|---|
| | | | a) crust | b) mass |
| 1.3 | 800 | 600 | + | + |
| 2.0 | 600 | 0 | − | − |
| 2.1 | 600 | 1,200 | + | +/− |
| 2.2 | 600 | 800 | + | +/− |
| 2.3 | 600 | 600 | +/− | − |

*)Waterproofing test:
+ = impermeability to water > 1 min ;
+/− = impermeability to water observable for 2–30 seconds;
− = no impermeability
To convert ppm into concentration in %, divide by 10,000.

Evaluation:

silicate alone is seen to have no effect, even at 10,000 ppm (trial A).

potassium methylsiliconate at 1,200 ppm is at the limit in the crushed mass but sufficient on the crust (trial B)

potassium methylsiliconate at 800 ppm is insufficient to impart hydrophobicity (trial 1.0).

When 600 ppm of silicate is added to 800 ppm of potassium methylsiliconate, a total hydrophobicity of the substrate is obtained (trial 1.3)

With 600 ppm potassium methylsiliconate, a quantity clearly below the limit for siliconate alone, the addition of 600 ppm silicate induces hydrophobicity on the crust (trial 2.3). With the addition of 800 ppm silicate, the crushed mass is rendered hydrophobic (trial 2.2).

Conclusion:

The data presented above shows that the co-addition of an equivalent quantity in ppm of silicate permits a reduction of about 50% in the minimum quantity of potassium methylsiliconate needed to assure an operational impermeability to water of a substrate. This represents a molar proportion of silicate to siliconate of about 2.

2. Effect of Adding Silicate to Methylsiliconate on Water Retention

Test Method:

Solutions containing these two reactants in different proportions are applied on the surface of sand samples by spraying evenly a 1 $m^2$ area on which cylindrical recipients of 9 cm diameter and 5 cm depth, containing 300 ml of sand, are placed. The surface is treated by spraying with 0.25 L/m2, 0.5 L/m2 and 1 L/m2 of the test solutions as described in Table 2. After drying in an oven, 60° C./12 h, 50 ml of water are injected under the each of the treated sand surfaces using a syringe, and the samples placed again in the oven at 60° C. for 24 hours.

Sand is treated with silicate (SI) and methylsiliconate (GSP), as described above, in a molar ratio on the order of 2:1 and placed in an oven at 60° C., with ventilation.

Quantities of reagents are given in % relative to the technical product, namely, a concentration of 1% potassium methylsiliconate, which contains 28% methylsiliconate, corresponds to a concentration of 0.28% methylsiliconate. Similarly, a concentration of 1% of silicate at 28% equivalent in $SiO_2$ corresponds to 0.28% silicate.

The results in the table below correspond to a loss of water by evaporation calculated in % per hour.

TABLE 2

EVAPORATION KINETICS

| No | TREATMENT | 0–1 h | 1–3 h | 3–5 h | 5–8 h | 8–24 h | Remainder |
|---|---|---|---|---|---|---|---|
| NTa | Reference sand with no treatment | 25.2 | 17.1 | 8.3 | 3.1 | 0.92 | <1 |
| NTb | Repetition | 26.1 | 17.1 | 8.6 | 2.5 | 0.93 | <1 |
| 1a | GSP 1% at 1 L/m2 | 2.9 | 2.8 | 3.1 | 2.9 | 2.9 | 33% |
| 1b | Repetition | 3.9 | 3.7 | 3.9 | 3.2 | 2.9 | 25% |
| 2a | GSP 1% at 0.5 L/m2 | 4.6 | 4.3 | 4.5 | 3.8 | 3.3 | 14% |
| 2b | Repetition | 4.5 | 3.8 | 4.7 | 3.8 | 3.5 | 11% |
| 3a | GSP 0.4% + SI 0.4% at 0.5 L/m2 | 3.3 | 3.1 | 3.5 | 2.8 | 3.0 | 27% |
| 3b | Repetition | 3.8 | 3.4 | 3.8 | 3.5 | 3.3 | 10% |
| 4a | GSP 0.4% + SI 0.4% at 0.25 L/m2 | 4.8 | 4.2 | 4.3 | 4.2 | 3.4 | 11% |
| 4b | Repetition | 5.0 | 4.6 | 4.7 | 4.7 | 3.4 | 8% |

Results:
1. Silicate added in a ratio of the order of 2 molecules for 1 molecule of siliconate permits at least a 50% reduction in the quantity of methylsiliconate needed (compare treatments 2 and 3). In other words, one can use a mixture of 0.5 vol. industrial methylsiliconate at 28%+0.5 vol. technical grade silicate 28% equivalent in $SiO_2$ for a similar—if not greater—anti-evaporation effect than with 1 vol. of industrial methylsiliconate alone.
2. Using 0.5 L/m2 of the mixture of silicate at 0.4% and at 0.4% gives a similar effect to 1 L/m2 of a solution of 1% potassium methylsiliconate (compare treatments 1 and 3). In practical terms, this means that the volume of water needed to apply the composition can be reduced by a factor of at least 2, without losing the efficiency of evaporation protection, namely by applying 5 $m^3$ per hectare instead of the 10 $m^3$ per hectare necessary with a solution of 1% $m^3$ potassium methylsiliconate alone.
3. The use of 0.25 L/m2 of the mixture silicate 0.4% and potassium methylsiliconate 0.4% already offers a very efficient treatment, as seen by comparing treatment No. 1, corresponding to a treatment of 100 L potassium methylsiliconate alone diluted in 10 $m^3$ of water per hectare, with the quantities in treatment No. 4, corresponding to a treatment of only 10 L potassium methylsiliconate in 2.5$m^3$ per hectare, albeit with the addition of 10 L of silicate.

These results above were obtained on the substrate "sand". One of ordinary skill in the art can readily adapt any of the solutions of the present invention for use on other substrates based on the granulometry, properties, and condition of the substrate or substrate components. For example, for a substrate that has a high level of salinity, such as would be found by the ocean, other amounts and concentrations of the hydrophobic agents in the solution, generally of a higher nature, would have to be considered. The skilled artisan can conduct routine testing to determine the optimum formulation of the treatment solution and the concentration of the hydrophobic agents to be included therein based on the specific substrate materials, components, properties and conditions of use.

As noted above, the substrates to be treated are preferably those which are porous to the aqueous treatment solution, so that the hydrophobic agents can be introduced into the substrate. The hydrophobic agents can be mixed with substrate forming components with the resulting mixture deposited on a surface to form a layer having hydrophobic properties. Other variations and modification can be made by the skilled artisan, and all are intended to fall within the scope of the appended claims.

What is claimed is:

1. An agricultural soil treating agent comprising an aqueous mixture of a C1 to C4 alkyl siliconate compound and a silicate compound which also includes a coloring agent, an agrochemical principle or both, with the siliconate and silicate compounds being present at a molar ratio of silicate compound to siliconate compound of 0.5/1 to 10/1 and in amount effective to increase hydrophobicity of the soil after the aqueous mixture is applied thereto due to the formation of silicic acid or silica gel therein in order to reduce water evaporation from the treated soil, wherein the siliconate compound is present in an amount of about 0.1 and 1% by weight and the silicate compound is present in an amount of about 0.01 and 5% by weight.

2. The agent of claim 1 wherein the siliconate compound is an alkali metal alkyl siliconate, the silicate compound is an alkali metal silicate, and the molar ratio is about 1:1 to 5:1.

3. The agent of claim 1 wherein the siliconate compound is an alkali metal methyl siliconate, the silicate compound is a sodium or potassium hydrosoluble silicate, and the molar ratio is about 1:1 to 5:1.

4. The agent of claim 1 wherein the siliconate compound is a sodium or potassium methyl siliconate, the silicate compound is a sodium or potassium ortho or meta-silicate, and the molar ratio is about 2:1 to 3:1.

5. The agent of claim 1 wherein the soil to be treated comprises sand.

6. The agent of claim 1 which contains both a coloring agent and an agrochemical principle.

7. The agent of claim 1 wherein, after being applied to the soil, the siliconate compound is present in an amount of between about 2 and 60 Kg per hectare, and the silicate compound is present in the treated substrate in an amount of between about 3 and 150 Kg per hectare.

8. The agent of claim 7 wherein the agricultural soil includes one or more of sand, gravel, tree bark, sawdust, compost, or earth, and the amount of water needed for application of the aqueous mixture is reduced by a factor of two compared to that needed for the application of a siliconate by itself for the same reduction of water evaporation from the treated soil.

9. An agricultural soil treating agent consisting essentially of a solution of an agrochemical principle and an aqueous mixture of a C1 to C4 alkyl siliconate compound and a silicate compound, with the compounds being present at a molar ratio of silicate compound to siliconate compound of 0.5/1 to 10/and in combination in amount effective to increase hydrophobicity of the soil after the agent is applied thereto due to the formation of silicic acid or silica gel therein in order to reduce water evaporation from the treated soil.

10. The agent of claim 9 wherein the siliconate compound is an alkali metal alkyl siliconate, the silicate compound is an alkali metal silicate, and the molar ratio is about 1:1 to 5:1.

11. The agent of claim 9 wherein the siliconate compound is an alkali metal methyl siliconate, the silicate compound is a sodium or potassium hydrosoluble silicate, and the molar ratio is about 1:1 to 5:1.

12. The agent of claim 9 wherein the siliconate compound is a sodium or potassium methyl siliconate, the silicate compound is a sodium or potassium ortho or meta-silicate, and the molar ratio is about 2:1 to 3:1.

13. The agent of claim 9 wherein the siliconate compound is present in an amount of about 0.1 and 1% by weight and the silicate compound is present in an amount of about 0.01 and 5% by weight.

14. The agent of claim 9 wherein the soil to be treated comprises sand and the agent also contains a coloring agent.

15. The agent of claim 9 wherein, after being applied to the soil, the siliconate compound is present in an amount of between about 2 and 60 Kg per hectare, and the silicate compound is present in the treated substrate in an amount of between about 3 and 150 Kg per hectare.

16. The agent of claim 9 wherein the agricultural soil includes one or more of sand, gravel, tree bark, sawdust, compost, or earth, and the amount of water needed for application of the solution is reduced by a factor of two compared to that needed for the application of a siliconate by itself for the same reduction of water evaporation from the treated soil.

17. An agricultural soil treating agent consisting of a solution of an aqueous mixture of a C1 to C4 alkyl siliconate compound and a silicate compound which also includes a coloring agent, an agrochemical principle or both, with the siliconate and silicate compounds being present at a molar ratio of silicate compound to siliconate compound of 0.5/1 to 10/1 and in combination in amount effective to increase hydrophobicity of the soil after the agent is applied thereto due to the formation of silicic acid or silica gel therein in order to reduce water evaporation from the treated soil, wherein the siliconate compound is present in an amount of about 0.1 and 1% by weight and the silicate compound is present in an amount of about 0.01 and 5% by weight.

18. The agent of claim 17 wherein the siliconate compound is an alkali metal methyl siliconate, the silicate compound is a sodium or potassium hydrosoluble silicate, and the molar ratio is about 1:1 to 5:1.

19. The agent of claim 17 wherein the siliconate compound is a sodium or potassium methyl siliconate, the silicate compound is a sodium or potassium ortho or meta-silicate, and the molar ratio is about 2:1 to 3:1.

* * * * *

UNITED STATES PATENT AND TRADEMARK OFFICE
CERTIFICATE OF CORRECTION

PATENT NO. : 6,916,366 B2
DATED : July 12, 2005
INVENTOR(S) : Hirsbrunner et al.

It is certified that error appears in the above-identified patent and that said Letters Patent is hereby corrected as shown below:

<u>Title page,</u>
Insert Item:
-- [30] Foreign Application Priority Data
April 17, 2001    (EP) .......01109290 --.

<u>Column 6,</u>
Line 66, delete "10/and" and insert -- 10/1 and --.

Signed and Sealed this

Twenty-fifth Day of April, 2006

JON W. DUDAS
*Director of the United States Patent and Trademark Office*